United States Patent
Kibe et al.

[11] Patent Number: 5,987,884
[45] Date of Patent: Nov. 23, 1999

[54] EXHAUST GAS PURIFICATION DEVICE

[75] Inventors: Kazuya Kibe; Masato Gotoh, both of Susono; Tatsuji Mizuno, Yokohama; Kouichi Akita, Susono, all of Japan

[73] Assignee: Toyota Jidosha Kabushiki Kaisha, Toyota, Japan

[21] Appl. No.: 09/095,763

[22] Filed: Jun. 11, 1998

[30] Foreign Application Priority Data

Jun. 19, 1997 [JP] Japan ..................................... 9-162956
Jul. 3, 1997 [JP] Japan ..................................... 9-178443

[51] Int. Cl.$^6$ ....................................................... F01N 3/00
[52] U.S. Cl. ................................ 60/286; 60/278; 60/285; 60/280; 123/443
[58] Field of Search .............................. 60/278, 280, 285, 60/286, 323; 123/443, 305, 568.11

[56] References Cited

U.S. PATENT DOCUMENTS

| | | |
|---|---|---|
| 4,056,933 | 11/1977 | Nohira et al. . |
| 4,179,892 | 12/1979 | Heydrich . |
| 5,746,189 | 5/1998 | Kuzuya et al. ......................... 123/568 |
| 5,803,048 | 9/1998 | Yano et al. ............................. 123/443 |
| 5,884,476 | 3/1999 | Hirota et al. ............................. 60/278 |
| 5,894,726 | 4/1999 | Monnier ................................... 60/274 |

FOREIGN PATENT DOCUMENTS

| | | |
|---|---|---|
| 0 838 582 A1 | 4/1998 | European Pat. Off. . |
| 4421 258 A1 | 12/1995 | Germany . |
| 6-74022 | 3/1994 | Japan . |
| 6-81631 | 3/1994 | Japan . |

*Primary Examiner*—Thomas E. Denion
*Assistant Examiner*—Binh Tran
*Attorney, Agent, or Firm*—Oliff & Berridge, PLC

[57] ABSTRACT

According to the invention, there is provided an exhaust gas purification device for purifying an exhaust gas discharged from an engine having cylinders including first and second cylinders. An exhaust stroke in the first cylinder is carried out next to an exhaust stroke in the second cylinder. The exhaust gas purification device comprises exhaust branch passages which are connected to the cylinders, respectively. The exhaust branch passages include first and second exhaust branch passages which are connected to the first and second cylinders, respectively. The exhaust gas purification device comprises a common exhaust passage connected to the exhaust branch passages, a catalyst positioned in the common exhaust passage for purifying an exhaust gas, and an exhaust gas recirculation passage connected to the first exhaust branch passage. The exhaust gas recirculation passage introduces the exhaust gas from the first exhaust branch passage into an intake passage which is connected to the cylinders. According to the invention, a reducing agent is fed to only the second cylinder during the power or the exhaust stroke in the second cylinder to promote the purifying operation of the catalyst when the exhaust gas is introduced into the intake passage via the exhaust gas recirculation passage.

12 Claims, 7 Drawing Sheets

EXHAUST GAS PURIFICATION DEVICE

BACKGROUND OF THE INVENTION

1. Field of the Invention

The invention relates to an exhaust gas purification device for purifying an exhaust gas discharged from an engine.

2. Description of the Related Art

An exhaust gas purification device is known for purifying an exhaust gas, in particular, nitrogen oxide (NOx) discharged from an engine. For example, the Japanese Unexamined Patent Publication No. 6-74022 discloses an exhaust gas purification device comprising a NOx catalyst which adsorbs NOx and hydrocarbon (HC) on a surface thereof to activate the NOx and HC, and reacts the activated NOx with the activated HC to purify the NOx, and a HC feeding valve for feeding HC to the NOx catalyst.

When the velocity at which the flame is transmitted in the cylinders during the power stroke of the engine (hereinafter, referring to as "flame transmitting velocity") is large, the amount of the NOx generated in the engine is large. Further, when the temperature at which the fuel is burned in the cylinders during the power stroke of the engine (hereinafter, referring to as "fuel burning temperature) is high, the amount of the NOx generated in the engine is large.

On the other hand, an inert gas decreases the flame transmitting velocity. Therefore, when the amount of the inert gas in the intake air is large, the flame transmitting velocity is decreased. Further, the inert gas absorbs the heat. Therefore, when the amount of the inert gas in the intake air is large, the fuel burning temperature is low.

In the exhaust gas purification device disclosed in Japanese Unexamined Patent Publication No. 6-74022, in order to restrict the generation of the NOx in the engine, exhaust gas including inert gas such as $CO_2$ and $H_2O$ is introduced into an intake air to decrease the flame transmitting velocity and lower the fuel burning temperature.

Further, in the exhaust gas purification device disclosed in Japanese Unexamined Patent Publication No. 6-74022, in order to prevent the HC from being introduced into the intake air, the exhaust gas to be introduced into the intake air is withdrawn from one of exhaust passages while the HC is fed into the other exhaust passages.

However, since the exhaust strokes in the cylinders are sequentially carried out, there is a possibility that the pressure in the exhaust passages into which the HC is fed becomes higher than that in the exhaust passage from which the exhaust gas to be fed into the intake air is withdrawn. In this case, the HC in the exhaust gas may be introduced into the intake air.

Therefore, the object of the invention is to prevent HC to be fed into a catalyst from being introduced into the intake air.

SUMMARY OF THE INVENTION

According to the invention, there is provided an exhaust gas purification device for purifying an exhaust gas discharged from an engine having a plurality of cylinders including first and second cylinders, an exhaust stroke in the first cylinder being carried out next to an exhaust stroke in the second cylinder, comprising: exhaust branch passages which are connected to the cylinders, respectively, the exhaust branch passages including first and second exhaust branch passages which are connected to the first and second cylinders, respectively a common exhaust passage connected to the exhaust branch passages; a catalyst positioned in the common exhaust passage for purifying an exhaust gas; reducing agent feeding means for feeding reducing agent to the second cylinder to promote the purifying operation of the catalyst; an exhaust gas recirculation passage for introducing the exhaust gas from the first exhaust branch passage into an intake passage which is connected to the cylinders, and control means for controlling the reducing agent feeding means to feed the reducing agent to only the second cylinder during one of the power and the exhaust strokes in the second cylinder when the exhaust gas is introduced into the intake passage via the exhaust gas recirculation passage.

Further, according to the invention, the reducing agent feeding means comprises an injector for injecting fuel into the second cylinder.

Further, according to the invention, the reducing agent feeding means feeds reducing agent to the cylinders, and the control means controls the reducing agent feeding means to feed reducing agent into the cylinders during one of the power and the exhaust strokes in the cylinders, respectively when the exhaust gas is not introduced into the intake passage via the exhaust gas recirculation passage.

Further, according to the invention, the first exhaust branch passage is connected to an upstream end of the common exhaust passage, and the second exhaust branch passage is connected to the common exhaust passage downstream of the upstream end of the common exhaust passage.

Further, according to the invention, the first and second exhaust branch passages are connected to the common exhaust passage in such a manner that: first and second exhaust branch passages are arranged in parallel adjacent to a position where the first and second exhaust branch passages are connected to the common exhaust passage.

Further, according to the invention, a cross sectional size of the second exhaust branch passage at which the second exhaust branch passage is connected to the common exhaust passage is smaller than that of the first exhaust branch passage at which the first exhaust branch passage is connected to the common exhaust passage.

Further, according to the invention, a ratio of the cross sectional size of the second exhaust branch passage to that of the first exhaust branch passage is between 1:3 and 1:1.

Further, according to the invention, a turbo-charger, which comprises an intake side turbine wheel positioned in the intake passage and an exhaust side turbine wheel positioned in the common exhaust passage adjacent to a position where said second exhaust branch passage is connected to said common exhaust passage, is provided for compressing an intake air in the intake passage, and the first and second exhaust branch passages are connected to the common exhaust passage in such a manner that the first and second exhaust branch passages are arranged in parallel adjacent to the position where the second exhaust branch passage is connected to the common exhaust passage to allow the exhaust gas discharged from the first and second exhaust branch passages to flow along a surface of the rotation of the exhaust side turbine wheel.

Further, according to the invention, a cross sectional size of the second exhaust branch passage at which the second exhaust branch passage is connected to the common exhaust passage is smaller than that of the first exhaust branch passage at which the first exhaust branch passage is connected to the common exhaust passage.

Further, according to the invention, a ratio of the cross sectional size of the second exhaust branch passage to that of the common exhaust passage is between 1:3 and 1:1.

Further, according to the invention, the first and second exhaust branch passages enclose the exhaust side turbine wheel, and are open toward the exhaust side turbine wheel.

Further, according to the invention, the cylinders include a third cylinder, the first, second and third cylinders are arranged in line, and the second cylinder is located between the first and third cylinders.

The present invention may be more fully understood from the description of the preferred embodiments of the invention set forth below, together with the accompanying drawings.

DESCRIPTION OF THE PREFERRED EMBODIMENTS

An exhaust gas purification device according to the first embodiment of the invention will be explained below.

Figure 1:
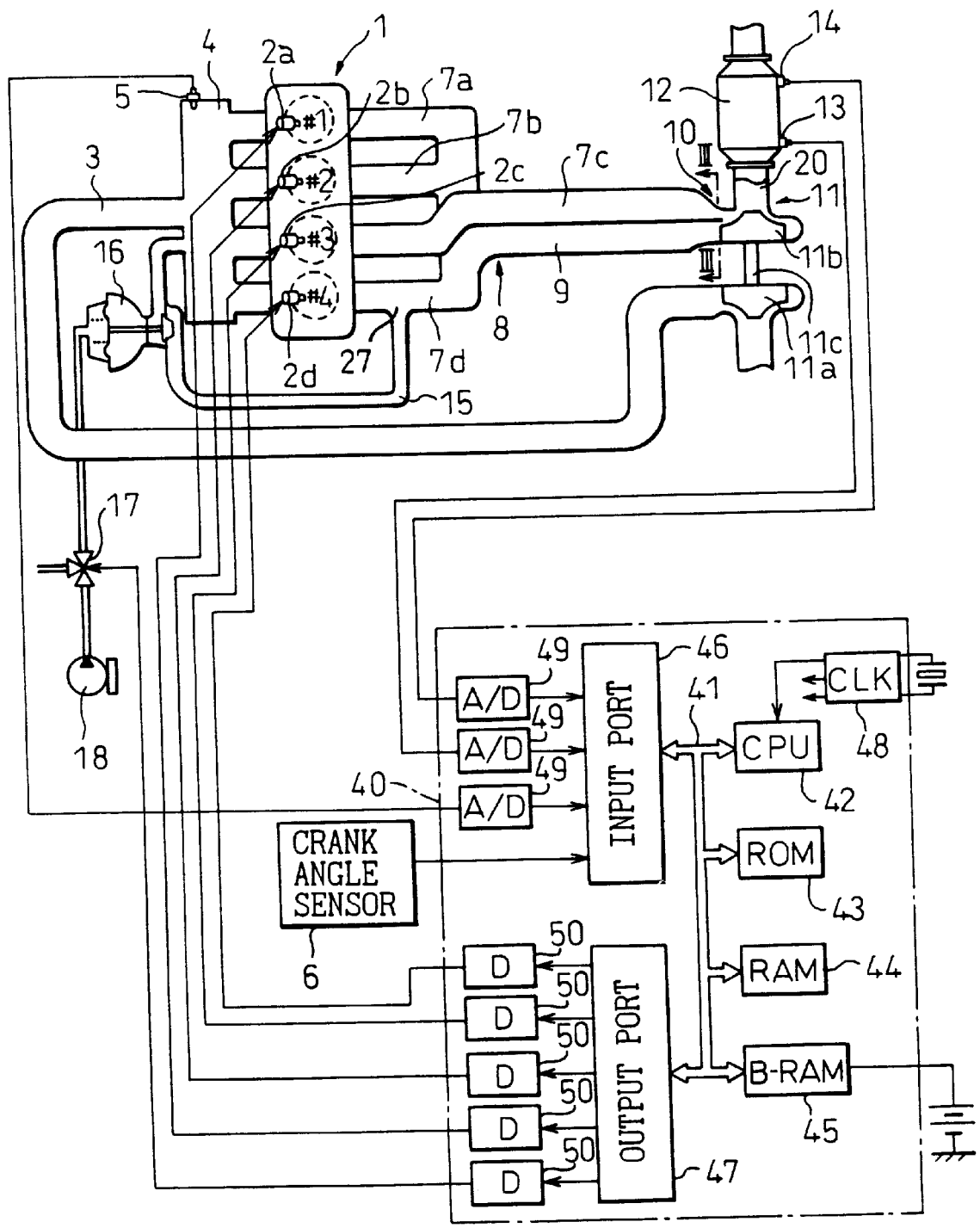
FIG. 1 is a view of an exhaust gas purification device according to the first embodiment of the invention.

In FIG. 1, reference number 1 illustrates an engine body, and reference numbers #1–#4 illustrate first to fourth cylinders formed in the engine body 1, respectively. The first to fourth cylinders are arranged in line. Therefore, the first and fourth cylinders correspond to the outermost cylinders, and the second and third cylinders correspond to the middle cylinders located between the outermost cylinders.

Reference numbers 2a–2d illustrate first to fourth fuel injectors, respectively for injecting fuel into the corresponding cylinders #1–#4 to drive the engine and purify an exhaust gas discharged from the engine as described below, reference number 3 illustrates an intake passage, reference number 4 illustrates an intake manifold connected to the intake passage 3.

An intake air pressure sensor 5 for detecting the pressure of an intake air in the intake passage to calculate an amount of the intake air fed to the cylinders #1–#4 is positioned in the intake manifold 4.

The engine of the first embodiment comprises a crank sensor 6 for detecting a crank angle. An engine speed is calculated on the basis of the detected crank angle.

The fuel is fed to each of the fuel injectors 2a–2d from a fuel or pressure storage chamber (not shown) which is common to the fuel injectors 2a–2d. The fuel chamber temporarily stores fuel under a predetermined pressure.

In the first embodiment, the fuel is burned sequentially in the first, third, fourth and second cylinders. Further, the intake passage or the intake manifold of the first embodiment corresponds to an intake system.

First to fourth exhaust branch passages 7a–7d are respectively connected to each of the first to fourth cylinders #1–#4. The first, second and fourth exhaust branch passages 7a, 7b and 7d are connected to each other and collected into a collection pipe 9 at an upstream connecting portion 8 which is downstream of the engine body 1.

The collection pipe 9 and the third exhaust branch passage 7c are connected to each other and are collected into an exhaust passage 20 at a downstream connecting portion 10 which is downstream of the upstream connecting portion 8.

In this specification, the words "upstream" and "downstream" are to indicate the flow of the exhaust gas. According to the first embodiment, provided that the collection pipe 9 and the exhaust passage 20 are considered as a common exhaust passage, the first, second and fourth exhaust branch passages are connected to an upstream end of the common exhaust passage, and the third exhaust branch passage is connected to the common exhaust passage downstream of the upstream end of the common exhaust passage.

The engine of the first embodiment comprises a turbo-charger 11 for compressing the intake air to increase the amount Of the intake air to be fed into the cylinders #1–#4. The turbo-charger 11 has an intake side turbine wheel 11a positioned in the intake passage 3 upstream of the intake manifold 4 and an exhaust side turbine wheel 11b positioned in the exhaust passage 20 downstream of the downstream collection portion 10. The exhaust side turbine wheel 11b is positioned at a portion where the exhaust gases discharged from each of the cylinders #1–#4 are gathered so that the compressing effect of the turbo-charger 11 is kept at a maximum.

The intake and exhaust side turbine wheels 11a and 11b are connected to each other by a common shaft 11c.

The exhaust side turbine wheel 11b receives the exhaust gas from a direction parallel to a rotating surface of the exhaust side turbine wheel 11b to rotate the exhaust side turbine wheel 11b, and discharges the received exhaust gas in the direction perpendicular to the rotating surface of the exhaust side turbine wheel 11b.

On the other hand, the intake side turbine wheel 11a is rotated according to the rotation of the exhaust side turbine wheel 11b, withdraws the intake air from a direction perpendicular to the rotating surface of the intake side turbine wheel 11a and discharges the withdrawn intake air in the direction parallel to the rotating surface of the intake side turbine wheel 11a.

A catalyst 12 for purifying nitrogen oxide (NOx) in the exhaust gas discharged from the engine is positioned in the exhaust passage 20 downstream of the exhaust side turbine wheel 11b. The catalyst 12 adsorbs NOx and hydrocarbon (HC) on the face thereof to activate NOx and HC, and reacts the activated NOx with the activated HC to purify the NOx (hereinafter, referred to as "NOx catalyst"). The NOx catalyst 12 purifies the NOx within a predetermined range of the temperature thereof.

An upstream temperature sensor 13 for detecting the temperature of the upstream end of the NOx catalyst 12 is positioned in the upstream end of the NOx catalyst 12. On the other hand, a downstream temperature sensor 14 for detecting the temperature of the downstream end of the NOx catalyst 12 is positioned in the downstream end of the NOx catalyst 12.

An exhaust gas recirculation passage 15 for introducing the exhaust gas into the intake air is connected to the fourth exhaust branch passage 7d. As described below in detail, the exhaust gas recirculation passage 15 is connected to the fourth exhaust branch passage 7d at a position such that the exhaust gas discharged from the third cylinder does not arrive at the exhaust gas recirculation passage 15 via the collection pipe 9 and the fourth exhaust branch passage 7d.

The other end of the exhaust gas recirculation passage 15 is connected to the intake manifold 4.

An exhaust gas recirculation valve 16 for controlling the introduction of the exhaust gas into the intake air is positioned in the exhaust gas recirculation passage 15.

The exhaust gas recirculation valve 16 is in communication with a suction pump 18 and the atmosphere via a three way valve 17. Further, the opening or closing of the exhaust gas recirculation valve 16 is controlled according to the engine driving condition.

When the exhaust gas recirculation valve 16 communicates with the atmosphere via the three way valve 17, atmospheric pressure is introduced into the exhaust gas recirculation valve 16 to close the valve 16. On the other hand, when the exhaust gas recirculation valve 16 communicates with the suction pump 18 via the three way valve 17, a negative pressure is introduced into the exhaust gas recirculation valve 16 to open the valve 16. In this case, the exhaust gas is introduced into the intake air.

As mentioned above, when the velocity at which the flame is transmitted in the cylinders during the power stroke of the engine is large, the amount of the NOx generated in the engine is large. Further, when the temperature at which the fuel is burned in the cylinders during the power stroke of the engine is high, the amount of the NOx generated in the engine is large.

On the other hand, an inert gas decreases the velocity at which the flame is transmitted. Therefore, when the amount of the inert gas in the intake air is large, the velocity at which the flame is transmitted in the cylinders during the power stroke of the engine is decreased.

Further, the inert gas absorbs the heat. Therefore, when the amount of the inert gas in the intake air is large, the temperature at which the fuel is burned in the cylinders during the power stroke of the engine is low.

From the above description, when the inert gas such as $CO_2$ or $H_2O$ is introduced into the intake air, the velocity at which the flame is transmitted in the cylinders during the power stroke of the engine is small, and the temperature at which the fuel is burned in the cylinders during the power stroke of the engine is low. Therefore, the generation of the NOx in the engine is restricted.

An electronic control unit (ECU) 40 is a digital computer, and comprises a microprocessor (CPU) 42, a read only memory (ROM) 43, a random access memory (RAM) 44, a back-up RAM (B-RAM) 45, an input port 46, an output port 47 and a clock generating device 48. These components are connected by a bilateral bus 41.

The output voltages from the intake air pressure sensor 5, the upstream temperature sensor 13 and the downstream temperature sensor 14 are input into the input port 46 via corresponding AD converters 49. The output voltage from the crank sensor 6 is directly input into the input port 46. On the other hand, the output port 47 is connected to each fuel injector 2a–2d and the three way valve 17 via corresponding drive circuits 50.

Figure 2:
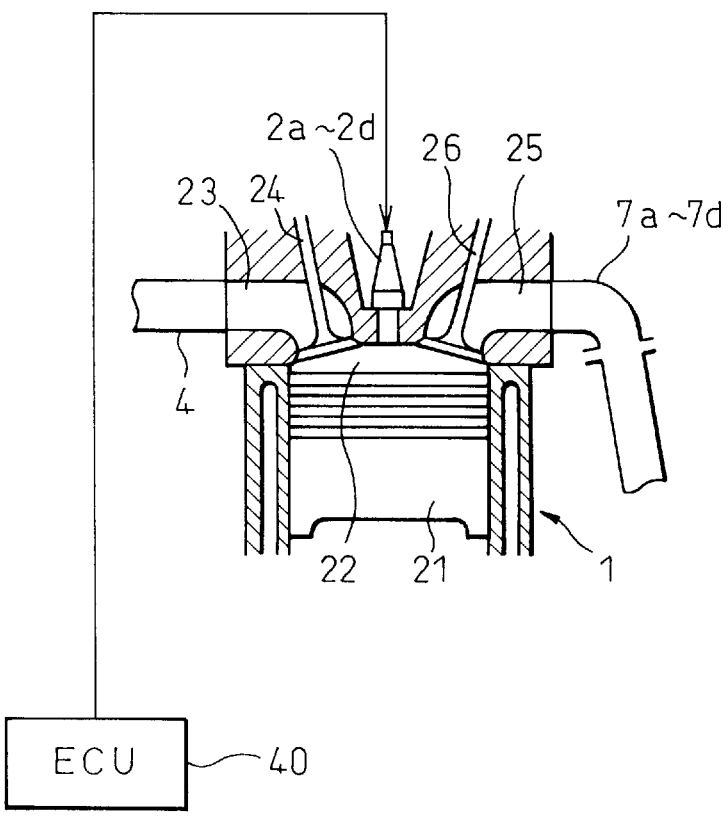
FIG. 2 is a sectional view of an engine body according to the first embodiment of the invention.

Referring to FIG. 2, reference number 21 illustrates a piston positioned in the cylinder #1–#4, reference number 23 illustrates an intake port connected to the intake manifold 4, reference number 24 illustrates an intake valve positioned in the intake port 23, reference number 25 illustrates an exhaust port connected to the exhaust passages 7a–7d, and reference number 26 illustrates an exhaust valve positioned in the exhaust port 25. In FIG. 2, the reference numbers 2a–2d illustrate the first to fourth fuel injectors, and reference number 40 illustrates the ECU.

The downstream collection portion according to the first embodiment will be explained below in detail.

Between the area upstream of the downstream collection portion 10 and the area adjacent to the downstream collection portion 10, the collection pipe 9 is connected to the third exhaust branch passage 7c in parallel with each other in such a manner that the exhaust gas discharged from the collection pipe 9 and the third exhaust branch passage 7c flows along the rotating surface of the exhaust side turbine wheel 11b.

Therefore, between the area upstream of the downstream collection portion 10 and the area adjacent to the downstream collection portion 10, the collection pipe 9 and the third exhaust branch passage 7c are positioned perpendicular to the axis of the shaft 11c of the turbo-charger 11.

Thus, the exhaust gas is discharged from the collection pipe 9 and the third exhaust branch passage 7c at the downstream collection portion 10 toward the exhaust side turbine wheel 11b in the direction parallel to the rotating surface of the exhaust side turbine wheel 11b and perpendicular to the axis of the shaft 11c of the turbo-charger 11.

The exhaust side turbine wheel 11b is rotated by the exhaust gas and the inertia of the rotation of the exhaust side turbine wheel 11b so that the exhaust side turbine wheel 11b functions to withdraw the exhaust gas from the collection pipe 9 and the third exhaust branch passage 7c to the exhaust side turbine wheel 11b itself.

Therefore, according to the first embodiment, it is ensured that the exhaust gas in the collection pipe 9 and the third exhaust branch passage 7c is withdrawn to the exhaust side turbine wheel 11b by the exhaust side turbine wheel 11b itself. Thus, the flow of the exhaust gas in the third branch passage 7c into the collection pipe 9 is prevented, and as a result, the introduction of the HC included in the exhaust gas into the intake air is prevented.

Figure 3:
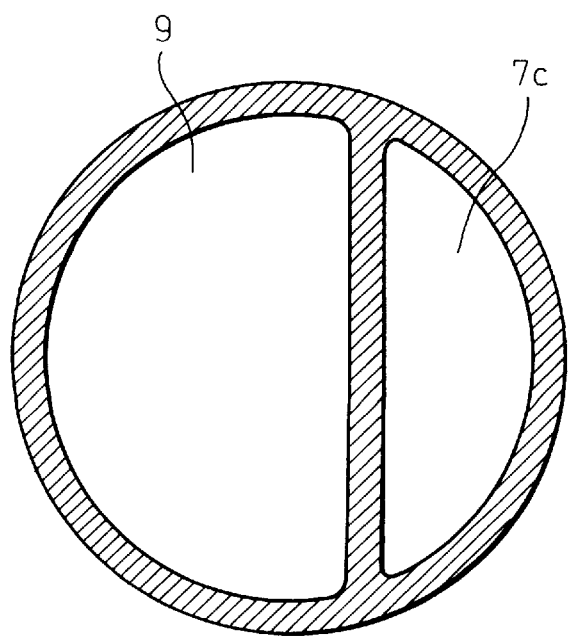
FIG. 3 is a sectional view along the line III—III in FIG. 1.

As shown in FIG. 3, the relationship between the cross sectional areas of the collection pipe 9 and the third exhaust branch passage 7c at the downstream collection portion 10 is 3:1, i.e., the ratio of the cross sectional area of the third exhaust branch passage 7c at which the third exhaust branch passage 7c is connected to the collection pipe 9 to the cross sectional area of the collection pipe 9 at which the collection pipe 9 is connected to the third exhaust branch passage 7c is 1:3. Since the cross sectional area of the third exhaust branch passage 7c is smaller than that of the collection pipe 9, the velocity of the exhaust gas discharged from the third exhaust branch passage 7c is increased. Therefore, it is ensured that the exhaust gas is discharged from the third exhaust branch passage 7c toward the exhaust side turbine wheel 11b. Thus, according to the first embodiment, it is ensured that the flow of the exhaust gas from the third exhaust branch passage 7c into the collection pipe 9 is prevented, and as a result, the introduction of the HC included in the exhaust gas into the intake air is prevented.

The ratio of the cross sectional area of the third exhaust branch passage 7c to that of the collection pipe 9 may be between 1:3 and 1:1.

An operation of the engine according to the first embodiment will be explained below.

Figure 5A:
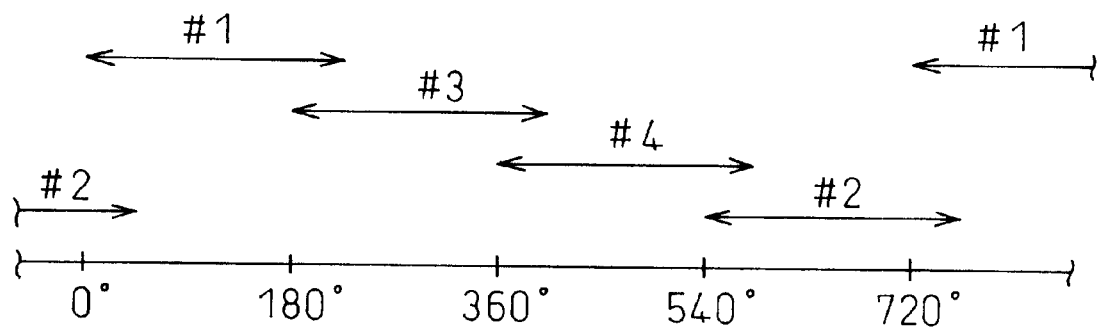
FIG. 5a is a view showing timings of the exhaust strokes in each cylinder.

As shown in FIG. 5a, the exhaust strokes are carried out sequentially in the first #1, third #3, fourth #4 and second #2 cylinders. Further, when the exhaust strokes in the cylinders #1–#4 are carried out, the exhaust valves 26 are open during crank angles larger than 180 degrees.

Figure 5B:
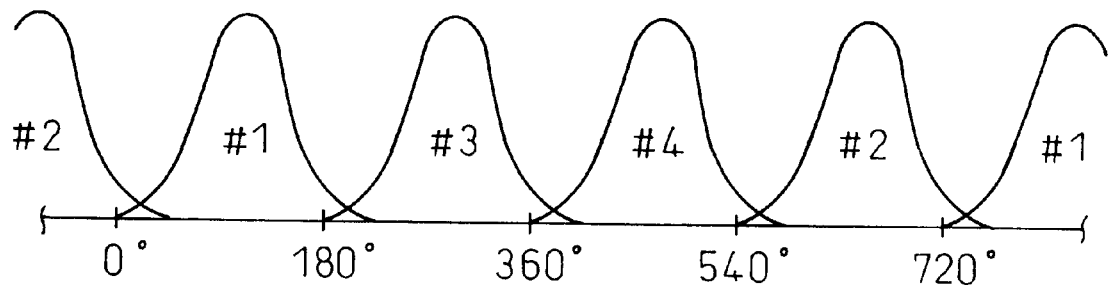
FIG. 5b is a view showing the pressure change in the cylinders.

As shown in FIG. 5b, the pressures of the exhaust gases discharged from the cylinders #1–#4 are sequentially changed.

Figure 5C:
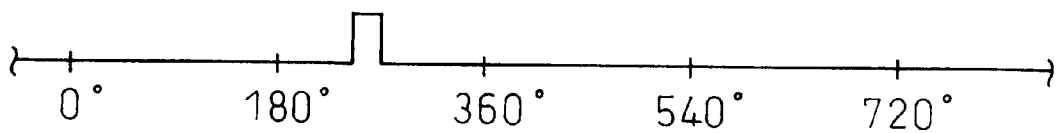
FIG. 5c is a view showing a timing of the injection of the HC from the injector.

As shown in FIG. 5c, HC for purifying the exhaust gas is injected into the third cylinder #3 during the exhaust stroke in the third cylinder #3 and, in addition, HC for driving the engine is injected into the third cylinder #3 during the compression stroke. However, according to the invention, the HC for purifying the exhaust gas may be injected into the third cylinder #3 during the power or exhaust stroke which is carried out after the HC for driving the engine is injected into the third cylinder #3.

Therefore, in the first embodiment, the exhaust stroke in the third cylinder #3 is carried out immediately before the exhaust stroke in the fourth cylinder #4 is carried out. In other words, the exhaust stroke in the fourth cylinder is carried out next to the exhaust stroke in the third cylinder. Thus, according to the first embodiment, in particular, under a specific range of the engine speed, when the exhaust gas including the HC discharged from the third cylinder #3 arrives at the downstream collection portion 10, the pressure in the collection pipe 9 is increased higher than that in the third exhaust branch passage 7c due to the exhaust gas discharged from the fourth cylinder #4.

According to the invention, the exhaust gas recirculation passage is connected to the fourth exhaust branch passage 7d in such a manner that the exhaust gas discharged from the fourth cylinder #4 arrives at the exhaust gas recirculation passage 15 when the exhaust gas discharged from the third cylinder #3 arrives at the exhaust gas recirculation passage 15.

Therefore, when the exhaust gas in the fourth exhaust branch passage 7d is introduced into the intake air via the exhaust gas recirculation passage 15 according to the engine driving condition, the introduction of the HC for purifying the exhaust gas into the intake air via the collection pipe 9, the fourth exhaust branch passage 7d and the exhaust gas recirculation passage 15 is prevented.

Thus, it is ensured that the HC for purifying the exhaust gas can arrive at the NOx catalyst 12. The NOx in the exhaust gas is purified at the catalyst 12 by the reducing action of the HC.

Further, since the flow of the exhaust gas from the third exhaust branch passage 7c into the collection pipe 9 is prevented, the exhaust gas is easily discharged from the first, second and fourth cylinders.

Further, since the third cylinder is located between the fourth cylinder and the first cylinder, the temperature in the third cylinder is higher than that in the fourth and first cylinders. Therefore, since the HC fed into the third cylinder can easily evaporate, the HC does not attach to the inner wall of the third cylinder. Therefore, according to the first embodiment, the intended amount of the HC can be supplied to the catalyst. Further, the HC attached to the inner wall of the cylinder does not pass through a clearance between the piston and the inner wall of the cylinder to oil held under the piston for the lubrication.

Further, as described above, the third exhaust branch passage 7c is connected to the collection pipe 9 and the fourth exhaust branch passage 7d downstream of the upstream collection portion 8. Therefore, the distance from the third cylinder #3 to an opening 27 of the exhaust gas recirculation passage 15 via the third exhaust branch passage 7c, the collection pipe 9 and the fourth exhaust branch passage 7d is longer than that from the first cylinder #1 to the opening 27 of the exhaust gas recirculation passage 15 via the first exhaust branch passage 7a and the fourth exhaust branch passage 7d, or that from the second cylinder #2 to the opening 27 of the exhaust gas recirculation passage 15 via the second exhaust branch passage 7b and the fourth exhaust branch passage 7d. Thus, it is more difficult for the HC for purifying the exhaust gas injected in the third cylinder #3 to arrive the opening 27 of the exhaust gas recirculation passage 15 than for the HC for purifying the exhaust gas injected in the first or second cylinder #1, #2.

Note that the amount of the HC for purifying the exhaust gas to be injected from the third fuel injector 2c is determined on the basis of the amount of the NOx in the exhaust gas and the temperature of the catalyst 12. The amount of the NOx in the exhaust gas is calculated on the basis of the outputs from the intake air pressure sensor 5 and the crank angle sensor 6. The temperature of the catalyst 12 is calculated on the basis of the outputs from the upstream and downstream temperature sensors 13 and 14.

Figure 4:
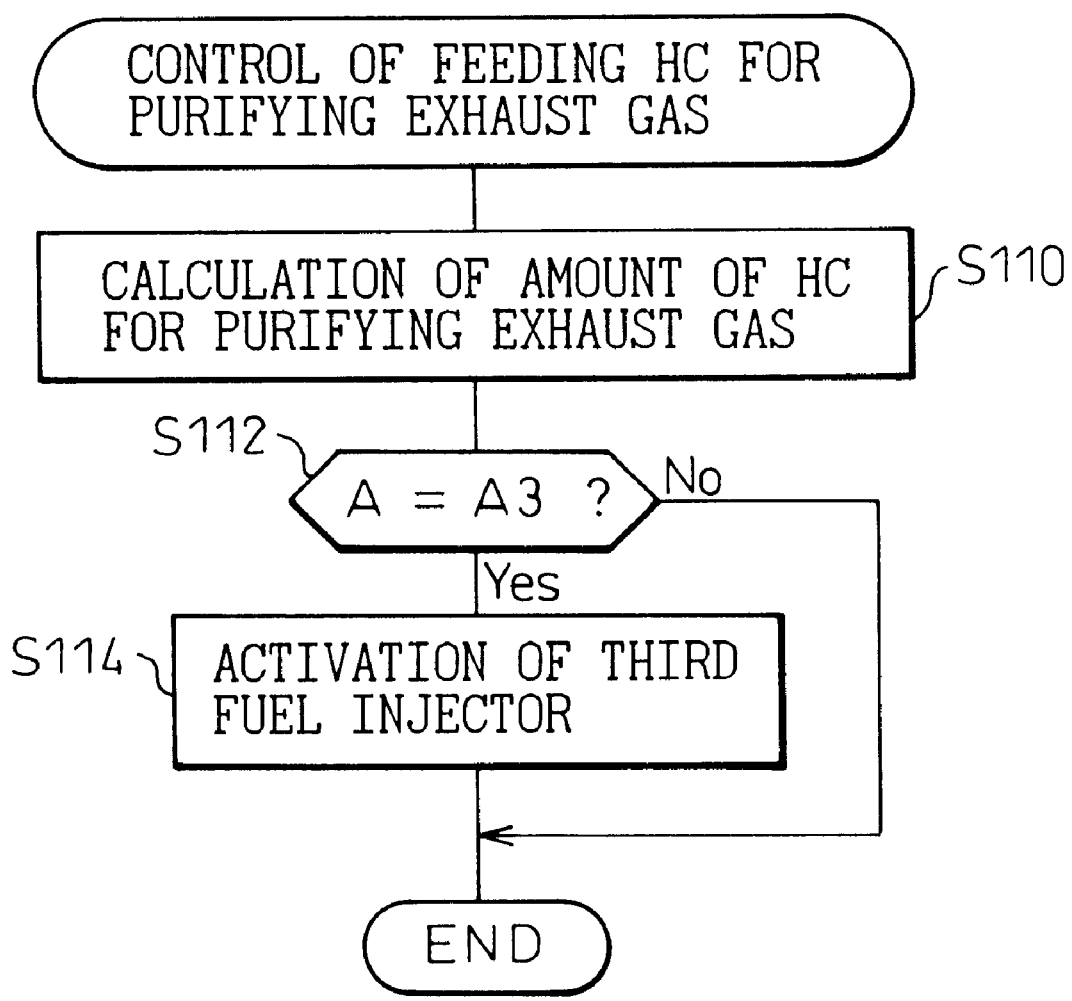
FIG. 4 is a flowchart of the control of the feeding of the HC for purifying the exhaust gas according to the first embodiment of the invention.

The control of the feeding of the HC for purifying the exhaust gas according to the first embodiment will be explained below by referring the flowchart of FIG. 4.

At step 110, the amount of the HC for purifying the exhaust gas to be injected from the third fuel injector 2c is calculated, and the routine proceeds to step 112. As described above, the amount of the HC for purifying the exhaust gas to be injected is calculated on the basis of the outputs from the intake air pressure sensor 5, the crank angle sensor 6 and the upstream and downstream temperature sensors 13 and 14.

At step 112, it is judged if the present crank angle A is at a predetermined crank angle A3 (A=A3). The predetermined crank angle A3 is the angle which is in the power stroke or the exhaust stroke and at which the HC for purifying the exhaust gas should be injected from the third fuel injector 2c into the third cylinder #3. At step 112, when A=A3, the routine proceeds to step 114 where the third fuel injector 2c is activated to inject the amount of the HC calculated at step 110 into the third cylinder #3, and the routine is ended. On the other hand, when A≠A3, the routine is ended.

In the first embodiment, a HC injector positioned in the third exhaust branch passage as means for feeding a reducing agent may be used. Further, the size of the opening of the collection pipe at the downstream collection portion may be decreased in order to increase the pressure in the collection pipe to prevent the flow of the exhaust gas from the third exhaust branch passage into the collection pipe.

An exhaust gas purification device according to the second embodiment of the invention will be explained below.

Components of the second embodiment are the same as those of the first embodiment. Therefore, an explanation thereof will not be given.

An operation of the engine according to the second embodiment will be explained below.

In the second embodiment, when the exhaust gas recirculation valve 16 is open, the HC for purifying the exhaust gas is injected from the third fuel injector 2c during the power or exhaust stroke in the third cylinder #3.

Operations other than those described above are the same as those of the first embodiment. Therefore, an explanation thereof will not be given.

On the other hand, when the exhaust gas recirculation valve 16 is closed, the HC for purifying the exhaust gas is injected from each of the fuel injectors 2a–2d during the power or exhaust stroke in each of the cylinders #1–#4.

The HC for purifying the exhaust gas arrives at the downstream collection portion 10 via the exhaust branch passages 7a–7d and the collection pipe 9 by the exhaust gas. In this case, since the exhaust gas recirculation valve 16 is closed, the introduction of the HC for purifying the exhaust gas injected from the first 2a, second 2b and fourth 2d fuel injectors into the intake air is prevented.

The amount of the HC for purifying the exhaust gas to be injected from each of the fuel injectors when the exhaust gas recirculation valve 16 is closed is determined on the basis of the amount of the NOx generated in each cylinder and the temperature of the catalyst 12.

On the other hand, the amount of the HC for purifying the exhaust gas to be injected from the third fuel injector when the exhaust gas recirculation valve 16 is open is determined on the basis of the amount of the NOx generated in the cylinders and the temperature of the catalyst 12.

Figure 6:
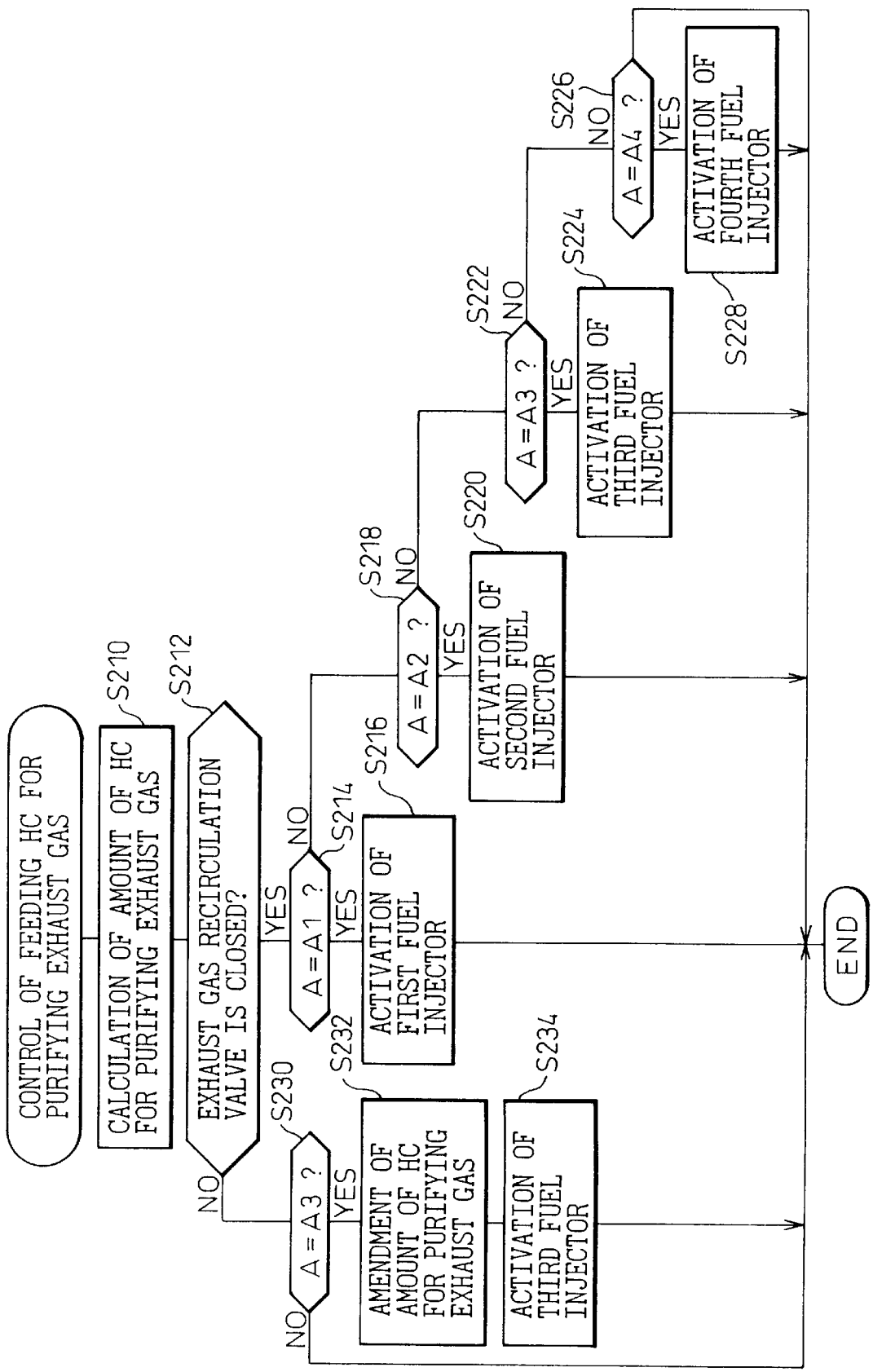
FIG. 6 is a flowchart of the control of the feeding of the HC for purifying the exhaust gas according to the second embodiment of the invention.

A control of the injection of the HC for purifying the exhaust gas according to the second embodiment will be explained below by referring a flowchart of FIG. 6.

At step 210, the amount of the HC for purifying the exhaust gas to be injected from each of the fuel injectors 2a–2d is calculated, and the routine proceeds to step 212. As described above, the amount of the HC for purifying the exhaust gas to be injected is calculated on the basis of the outputs from the intake air pressure sensor 5, the crank angle sensor 6 and the upstream and downstream temperature sensors 13 and 14.

At step 212, it is judged if the exhaust gas recirculation valve 15 is closed. When the exhaust gas recirculation valve 15 is closed, the routine proceeds to step 214. On the other band, when the exhaust gas recirculation valve 15 is open, the routine proceeds to step 230.

At step 214, it is judged if the present; crank angle A is at a predetermined crank angle Al (A=A1). The predetermined crank angle Al is the angle which is in the power or exhaust stroke in the first cylinder #1 and at which the HC for purifying the exhaust gas should be injected from the first fuel injector 2a into the first cylinder #1. At step 214, when A=A1, the routine proceeds to step 216 where the first fuel injector 2a is activated to inject the amount of the HC calculated at step 110 into the first cylinder #1, and the routine is ended. On the other hand, when A≠A1, the routine proceeds to step 218.

At step 218, it is judged if the present crank angle A is at a predetermined crank angle A2 (A=A2). The predetermined crank angle A2 is the angle which is in the power or exhaust stroke in the second cylinder #2 and at which the HC for purifying the exhaust gas should be injected from the second fuel injector 2b into the second cylinder #2. At step 218, when A=A2, the routine proceeds to step 220 where the second fuel injector 2b is activated to inject the amount of the HC calculated at step 110 into the second cylinder #2, and the routine is ended. On the other hand, when A≠A2, the routine proceeds to step 222.

At step 222, it is judged if the present crank angle A is at a predetermined crank angle A3 (A=A3). The predetermined crank angle A3 is the angle which is in the power or exhaust stroke in the third cylinder #3 and at which the HC for purifying the exhaust gas should be injected from the third fuel injector 2c into the third cylinder #3. At step 222, when A=A3, the routine proceeds to step 224 where the third fuel injector 2c is activated to inject the amount of the HC calculated at step 110 into the third cylinder #3, and the routine is ended. On the other hand, when A≠A3, the routine proceeds to step 226.

At step 226, it is judged if the present crank angle A is at a predetermined crank angle A4 (A=A4). The predetermined crank angle A4 is the angle which is in the power or exhaust stroke in the fourth cylinder #4 and at which the HC for purifying the exhaust gas should be injected from the fourth fuel injector 2d into the fourth cylinder #4. At step 226, when A=A4, the routine proceeds to step 228 where the fourth fuel injector 2d is activated to inject the amount of the HC calculated at step 110 into the fourth cylinder #4, and the routine is ended. On the other hand, when A≠A4, the routine is ended.

At step 230, it is judged if the present crank angle A is at a predetermined crank angle A3 (A=A3). At step 230, when A=A3, the routine proceeds to step 332 where the amount of the HC calculated at step 110 is amended to the amount of the HC sufficient to purify the NOx from all cylinders, the routine proceeds to step 234 where the third fuel injector 2d is activated to inject the amount of the HC amended at step 232 into the third cylinder #3, and the routine is ended. On the other hand, when A≠A3, the routine is ended.

An exhaust gas purification device according to the third embodiment of the invention will be explained below.

Figure 7:
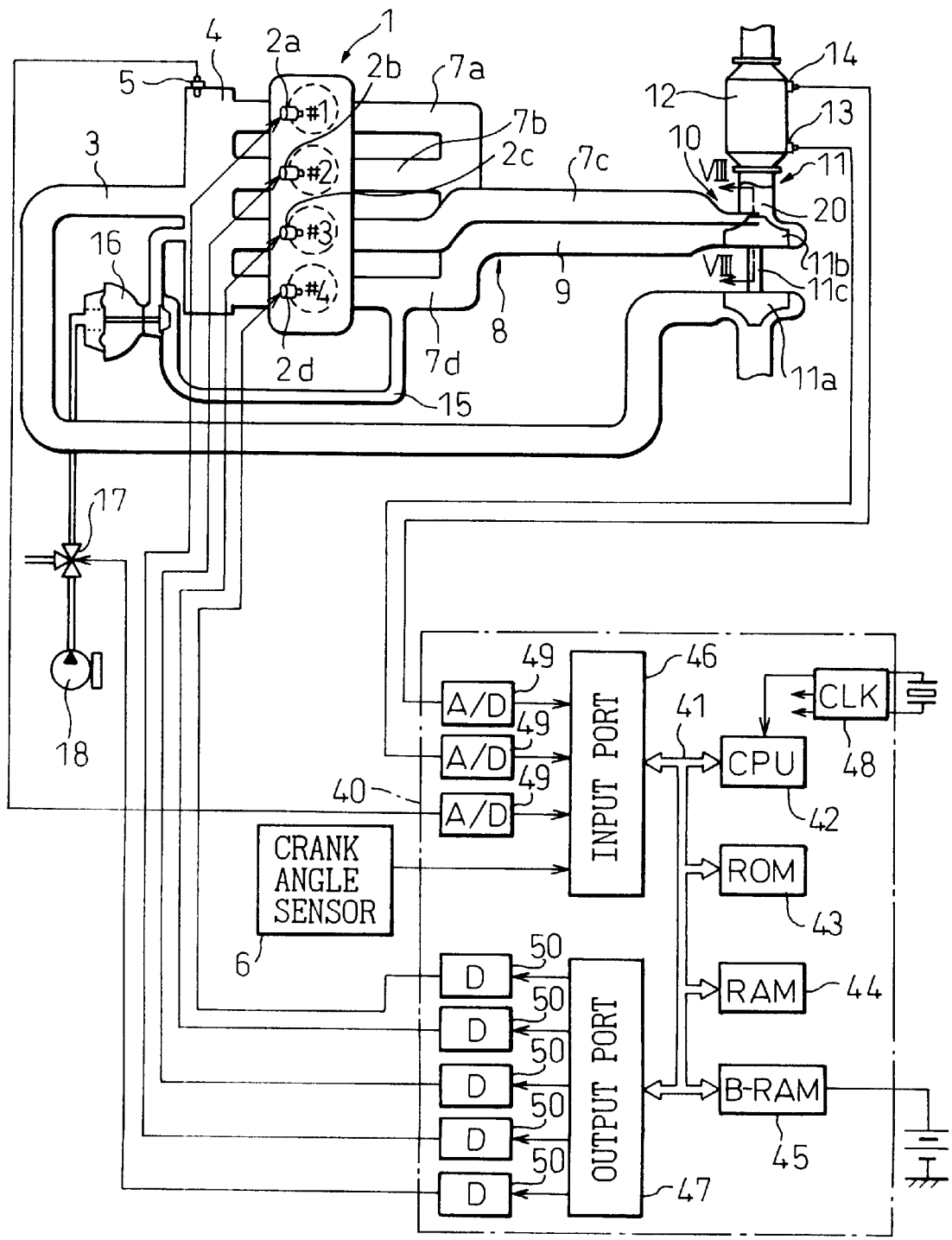
FIG. 7 is a view of an exhaust gas purification device according to the third embodiment of the invention.
Figure 8:
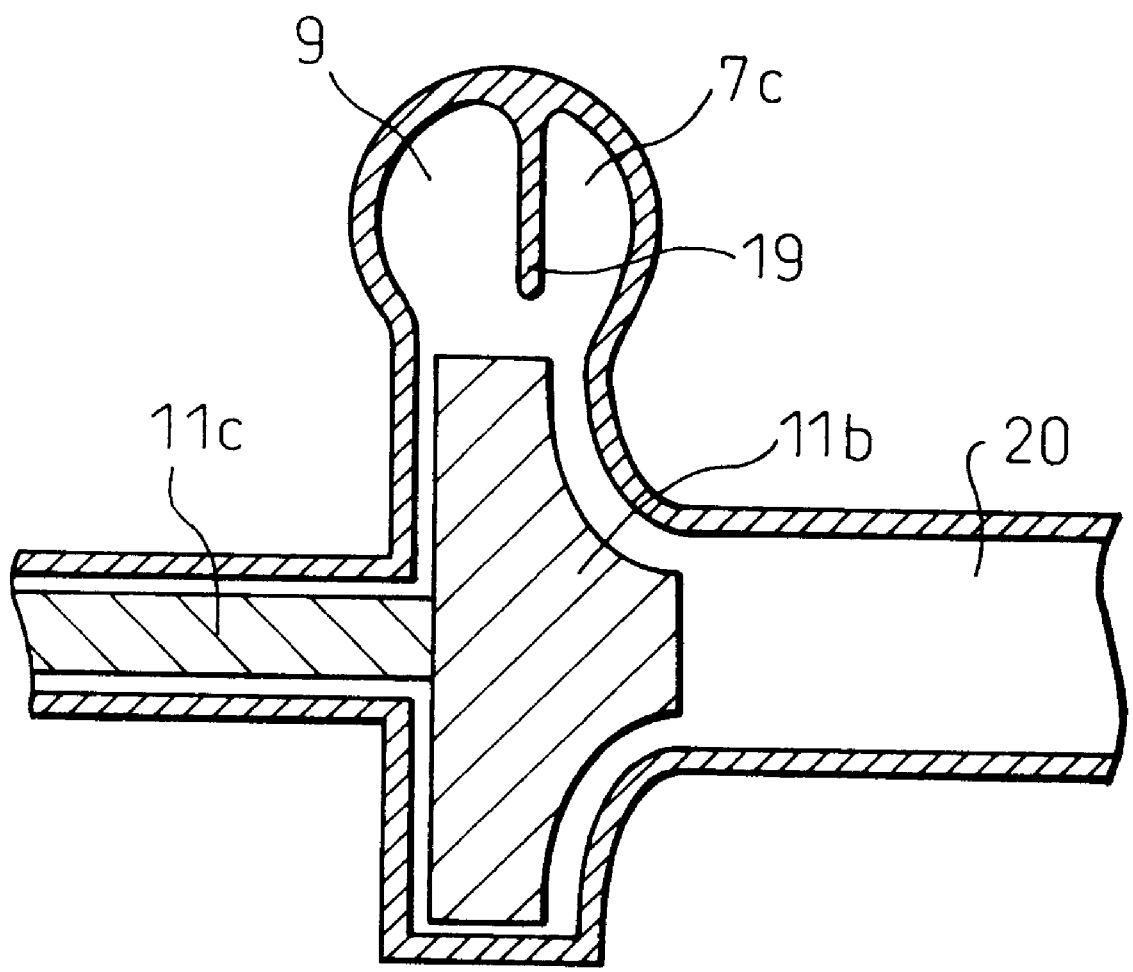
FIG. 8 is a sectional view along the line VIII—VIII in FIG. 7.

As shown in FIGS. 7 and 8, in the third embodiment, at the downstream collection portion 10, the third exhaust branch passage 7c and the collection pipe 9 extend to enclose the exhaust side turbine wheel 11b.

As shown in FIG. 8, a part of the third exhaust branch passage 7c and a part of the collection pipe 9 are open to the exhaust side turbine wheel 11b. In other words, the third exhaust branch passage 7c and the collection pipe 9 are divided by a separating wall 19 around the exhaust side turbine wheel 11b.

In order to increase the velocity of the flow of the exhaust gas discharged from the third exhaust branch passage 7c, the relationship between the cross sectional size such as the cross sectional areas of the collection pipe 9 and the third exhaust branch passage 7c at the downstream collection portion 10 is 3:1 to 1:1. In other words, the ratio of the cross sectional size of the third exhaust branch passage 7c to that of the collection pipe 9 is from 1:3 to 1:1.

According to the third embodiment, compared with the first embodiment, it is further ensured that the exhaust gas is discharged from the third exhaust branch passage 7c toward the exhaust side turbine wheel 7c. Therefore, compared with the first embodiment, it is further ensured that the flow of the exhaust gas from the third exhaust branch passage 7c into the collection pipe 9 is prevented, and the introduction of the HC for purifying the exhaust gas into the intake air is prevented.

Components other than those described above and operations of the third embodiment are the same as those of the first embodiment. Therefore, an explanation thereof will not be given.

While the invention has been described by reference to specific embodiments chosen for purposes of illustration, it should be apparent that numerous modifications can be made thereto by those skilled in the art without departing from the basic concept and scope of the invention.

We claim:

1. An exhaust gas purification device for purifying an exhaust gas discharged from an engine having a plurality of cylinders including first and second cylinders, an exhaust stroke in said first cylinder being carried out next to an exhaust stroke in said second cylinder, comprising:

exhaust branch passages which are connected to said cylinders, respectively, said exhaust branch passages including first and second exhaust branch passages which are connected to said first and second cylinders, respectively;

a common exhaust passage connected to said exhaust branch passages;

a catalyst positioned in said common exhaust passage for purifying an exhaust gas;

reducing agent feeding means for feeding reducing agent to said second cylinder to promote the purifying operation of said catalyst;

an exhaust gas recirculation passage for introducing the exhaust gas from said first exhaust branch passage into an intake passage which is connected to said cylinders; and control means for controlling said reducing agent feeding means to feed the reducing agent to only said second cylinder during one of the power and the exhaust strokes in said second cylinder when the exhaust gas is introduced into said intake passage via said exhaust gas recirculation passage.

2. An exhaust gas purification device according to claim 1, wherein said reducing agent feeding means comprises an injector for injecting fuel into said second cylinder.

3. An exhaust gas purification device according to claim 1, wherein said reducing agent feeding means feeds reducing agent to said cylinders, and said control means controls said reducing agent feeding means to feed reducing agent into said cylinders during one of the power and the exhaust strokes in said cylinders, respectively when the exhaust gas is not introduced into said intake passage via said exhaust gas recirculation passage.

4. An exhaust gas purification device according to claim 1, wherein said first exhaust branch passage is connected to an upstream end of said common exhaust passage, and said second exhaust branch passage is connected to said common exhaust passage downstream of said upstream end of said common exhaust passage.

5. An exhaust gas purification device according to claim 1, wherein said first and second exhaust; branch passages are connected to said common exhaust passage in such a manner that said first and second exhaust branch passages are arranged in parallel adjacent to a position where said first and second exhaust branch passages are connected to said common exhaust passage.

6. An exhaust gas purification device according to claim 5, wherein a cross sectional size of said second exhaust branch passage at which said second exhaust branch passage is connected to said common exhaust passage is smaller than that of said first exhaust branch passage at which said first exhaust branch passage is connected to said common exhaust passage.

7. An exhaust gas purification device according to claim 6, wherein a ratio of said cross sectional size of said second exhaust branch passage to that of said first exhaust branch passage is between 1:3 and 1:1.

8. An exhaust gas purification device according to claim 1, wherein a turbo-charger, which comprises an intake side turbine wheel positioned in said intake passage and an exhaust side turbine wheel positioned in said common exhaust passage adjacent to a position where said second exhaust branch passage is connected to said common exhaust passage, is provided for compressing an intake air in said intake passage, and said first and second exhaust branch passages are connected to said common exhaust passage in such a manner that said first and second exhaust branch passages are arranged in parallel adjacent to said position where said second exhaust branch passage is connected to said common exhaust passage to allow the exhaust gas discharged from said first and second exhaust branch passages to flow along a surface of the rotation of said exhaust side turbine wheel.

9. An exhaust gas purification device according to claim 8, wherein a cross sectional size of said second exhaust branch passage at which said second exhaust branch passage is connected to said common exhaust passage is smaller than that of said first exhaust branch passage at which said first exhaust branch passage is connected to said common exhaust passage.

10. An exhaust gas purification device according to claim 9, wherein a ratio of the cross sectional size of said second exhaust branch passage to that of said first exhaust branch passage is between 1:3 and 1:1.

11. An exhaust gas purification device according to claim 8, wherein said first and second exhaust branch passages enclose said exhaust side turbine wheel, and are open toward said exhaust side turbine wheel.

12. An exhaust gas purification device according to claim 1, wherein said cylinders include a third cylinder, said first, second and third cylinders are arranged in line, and said second cylinder is located between said first and third cylinders.

* * * * *